United States Patent [19]

Born et al.

[11] Patent Number: 5,058,206

[45] Date of Patent: Oct. 15, 1991

[54] OPTICAL NETWORK IN WHICH THE TRANSMISSION, THE JOINING AND SEPARATION, AS WELL AS THE ROUTING OF INFORMATION AND CONTROL SIGNALS TAKE PLACE IN THE OPTICAL DOMAIN

[75] Inventors: Sijtze Born, The Hague; Johannes H. Herlaar, Leidschendam, both of Netherlands

[73] Assignee: Koninklijke PTT Nederland N.V., Groningen, Netherlands

[21] Appl. No.: 681,413

[22] Filed: Apr. 4, 1991

Related U.S. Application Data

[63] Continuation of Ser. No. 368,050, Jun. 16, 1989, abandoned.

[30] Foreign Application Priority Data

Jun. 22, 1988 [NL] Netherlands ............... 8801590

[51] Int. Cl.$^5$ ............................................. H04B 10/00
[52] U.S. Cl. ..................................... 359/164; 359/173; 359/152; 359/117; 359/124
[58] Field of Search ................ 455/612, 600, 601, 607, 455/610; 370/1, 3

[56] References Cited

U.S. PATENT DOCUMENTS

| | | | |
|---|---|---|---|
| 4,704,713 | 11/1987 | Haller et al. | 455/612 |
| 4,761,832 | 8/1988 | Gade et al. | 455/612 |

FOREIGN PATENT DOCUMENTS

| | | | |
|---|---|---|---|
| 0198932 | 10/1986 | European Pat. Off. | |
| 60-25332 | 2/1985 | Japan | |
| 60-105334 | 6/1985 | Japan | |
| 0009335 | 1/1988 | Japan | 370/1 |
| 2154091 | 8/1985 | United Kingdom | 370/1 |

OTHER PUBLICATIONS

E.D.N. Electrical Design News, vol. 26, No. 5, Mar. 4, 1981, V. L. Mirtich: "Fiber Optics Offers Promise in Data-Network Design".
Dutch Search Report.
Nachrichtentechnische Berichte, No. 1, 1984, G. Blume et al., "Optische Verbindungstechnik Koppler und Garnituren".

*Primary Examiner*—Herbert Goldstein
*Assistant Examiner*—Kinfe-Michael Negash
*Attorney, Agent, or Firm*—Frishauf, Holtz, Goodman & Woodward

[57] ABSTRACT

An information transmission network containing switching devices connected to each other by transmission sections and respectively connected to stations of a network by other transmission sections is constituted in such a way that not only the transmission of information and control signals in the transmission sections, but also the switching in the switching devices and the combination or separation of the control and information signals, take place in the optical domain. They are distinguishable from the information signals in the optical domain by transmission wavelength and/or polarization and/or by direction of transmission. For controlling a switching device a control signal is transmitted from a station to the switching device by way of a glass fiber which at the same time serves for the transmission of information signals in the opposite direction.

16 Claims, 4 Drawing Sheets

OPTICAL NETWORK IN WHICH THE TRANSMISSION, THE JOINING AND SEPARATION, AS WELL AS THE ROUTING OF INFORMATION AND CONTROL SIGNALS TAKE PLACE IN THE OPTICAL DOMAIN

This application is a continuation of application Ser. No. 07/368,050 now abandoned, filed June 16, 1989.

A. BACKGROUND OF THE INVENTION

1. Field of the invention

The invention relates to a network for transmitting information signals between stations connected to that network, which is provided with a number of switching devices and a number of transmission sections, which switching devices can switch on, switch over or switch off parts of the network or stations connected to the network by means of control signals, and which transmission sections achieve the transmission of information signals between one switching device and another respectively between the switching devices and the stations connected to the network, for which purpose the information signals are supplied to those transmission sections on one side of them, and are separated on the other side of them, and which transmission sections comprise one or more parallel optical conductors (e.g. glass fibres), at least part of the number of transmission sections moreover achieving the transmission of said control signals to the switching devices, for which purpose in the relevant transmission sections also the control signals are supplied to those transmission sections on one side of them and are separated on the other side of them, the transmission of said signals in the transmission sections at taking place at least substantially in the optical domain.

2. State of the art

A network as mentioned above is known from "TELEPHONY" of April 15, 1985 [1], notably pp. 60-64, in which various network configurations are described, formed substantially formed by transmission sections and switching devices. External stations (hosts) can be connected—via transmission sections—to the network, which stations can then interchange information signals via the network. The transmission section which has come from a suchlike station is connected to a switching device, which is connected to the rest of the network, in this case to other switching devices, via further transmission sections. The switching device has the function either to connect the latter transmission sections to one another and to close in itself at the same time the transmission section coming from the host (first switching state), or to insert this transmission section coming from the host between the transmission sections connected to the rest of the network (second switching state). The control of the switching device takes place from the host: after the host has checked its transmission section for a correct working—the switching device is in said first switching state—it will transmit a control signal ("JOIN" command) to the switching device. Owing to this control signal the switching device switches over to said second switching state, as a result of which the host will be inserted into the network. When the host wants to discontinue its connection to the network, it will transmit for that purpose a control signal to the switching device again, as a result of which this switching device will come into the former state again.

Besides switching devices for connecting a host to the network, the network can also comprise switching devices for effecting a reconfiguration of the network, for example in the event of a disturbance or for the sake of maintenance. These switching devices are then controlled—by means of control signals—for example by one another or by a central device.

In the transmission sections the transmission of the signals takes place substantially in the optical domain: the transmission sections consist of one or more glass fibres, which are connected at both ends to E/O converters, where electric signals are converted into optical signals or vice versa.

In the switching devices the switching of the transmission sections takes place in the electrical domain, in other words, the switching devices are electric as to their nature.

The control signals are transmitted next to the information signals via the same glass fibres. For this purpose "intelligence" is added to said E/O-converters and the control signals and the information signals in the electrical domain are joined by means of multiplexing or separated from one another by means of demultiplexing.

Summarizing it can be stated that the transmission of the control signals and of the information signals takes place (substantially) in the optical domain, whereas on the other hand the switching and the joining respectively the separation of the control signals and the information signals take place in the electrical domain. Because of the fact that the conversion from the optical domain to the electrical domain and vice versa takes place relatively frequently, the network is separated at many places by active (electronic) elements. This (repeated) conversion works restrictively with regard to the sort (of form) and the speed of the information signals to be transmitted via the network; in other words, the conversion restricts the maximum speed of transmission to be reached and the possibilities (freedom) with regard to the sort (e.g. digital, analog, coherent) of those signals. Moreover the known network can transmit only those information signals and control signals for which the conversion devices are suited. Consequently it will be possible to realize future changes with regard to the sort and/or the speed of transmission to a limited degree without adapting or replacing all (!) the conversion devices in the network—if that would be possible—.

B. SUMMARY OF THE INVENTION

The object of the present invention is to provide a network of the sort indicated under par. A.1., the drawbacks of the known network mentioned in the last part of par. A.2. being overcome. For that purpose the present invention provides a network of the aforesaid type in which the transmission of said signals in the transmission sections, as well as the switching in the switching devices, and the supply of the control signals and the information signals to the relevant transmission sections and the separation of these signals from said transmission sections take place entirely in the optical domain. So the information signals need not be converted at several points from the optical domain to the electrical domain and vice versa—as in the known network configuration —. Because of the fact that the transmission of information signals through the whole network takes place in the optical domain (except for the coupling interfaces with stations connected to the network, as far as they work in the electrical domain), the maximum speed of transmission that can be reached and the freedom and flexibility with regard to the sort (of form) of the information signals will not be limited by O/E - E/O-conversions.

In order to make it possible to switch a switching device by means of a control signal the control signals and the information signals in said relevant transmission sections are—according to a further embodiment of the invention—distinguishable from each other in the optical domain, and the relevant control signals and information signals are directly coupled in into one and the same optical conductor respectively coupled out of the same by means of optical coupling devices.

According to a preferred embodiment the control signal and the information signal distinguish tnemselves in the optical domain by means of different optical transmission modes: for example the respective wavelengths or the respective polarization modes of the control signal and of the information signal can be different.

In addition to the aforesaid means for distinguishing the control signals and information signals in the optical domain from each other, this distinction can moreover and preferably be effected by transmitting the control signals and the information signals which make use of the same optical conductor via this optical conductor in a direction which is different (opposite) for each signal. For controlling a switching device a control signal is then transmitted to the switching device via a glass fibre, which is at the same time meant for the transmission of information signals in the opposite direction, so from that verY switching device. According to this preferred embodiment of the invention the control signals are in the relevant transmission sections coupled in on a first side of the relevant optical conductor into that conductor, and are coupled out of that conductor on an opposite, second side of it, whereas the information signals, on the other hand, are coupled in on the second side of that optical conductor into that conductor, and are coupled out of that conductor on the first side of it.

Said coupling devices are preferably formed by fused couplers known per se (vide ref. [2]). These couplers have small dimensions, they are comparatively cheap and have moreover the advantage that they can be made in such a way that they will have the desired selectivity with regard to e.g. the respective wavelength and/or direction of the control signals and the information signals.

C. EMBODIMENTS

The invention will be further elucidated with the aid of a description and associated figures of an embodiment of the same.

1. FIGURES

2. DESCRIPTION

FIGURE 1

Figure 1:
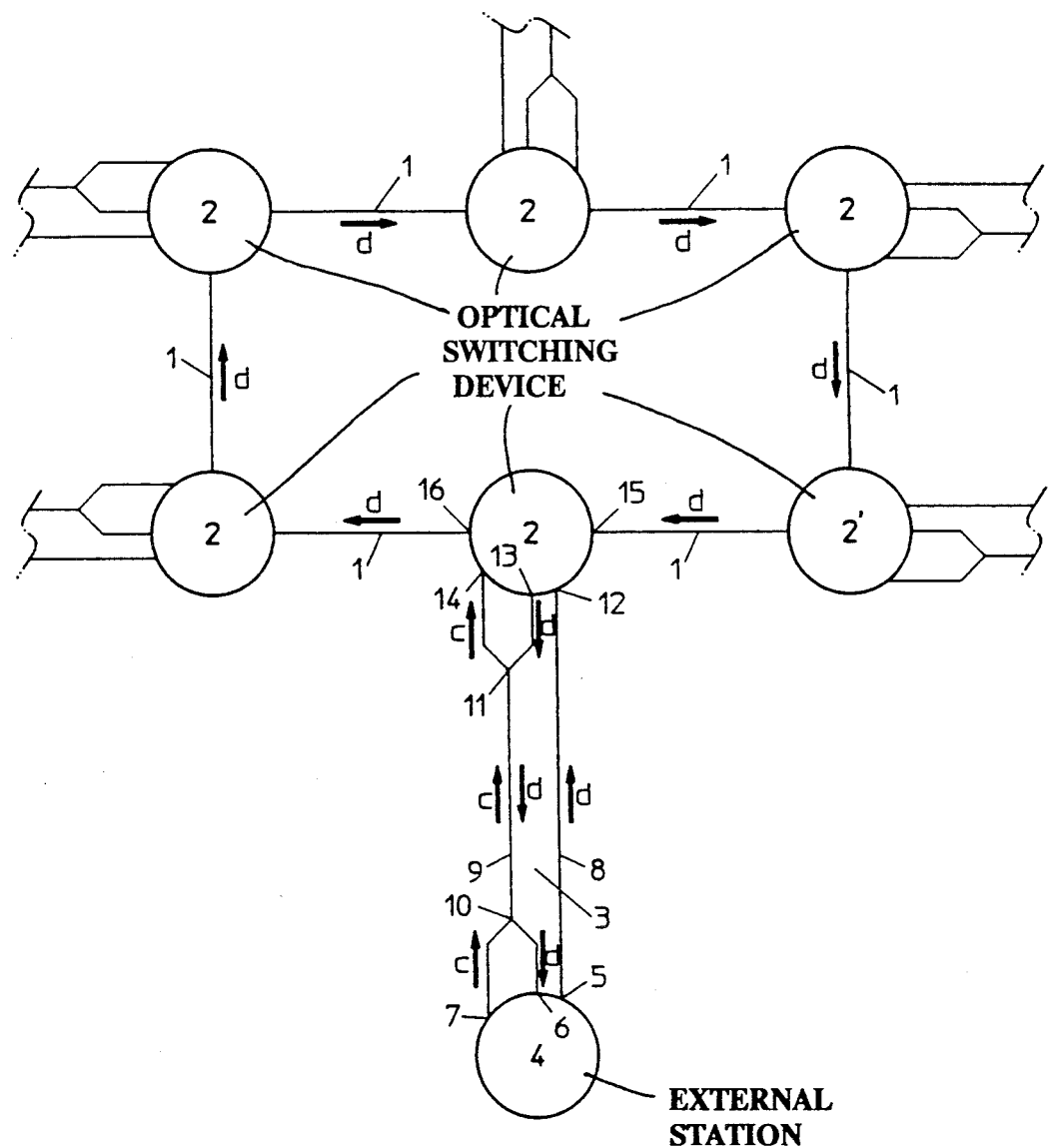
FIG. 1 shows a simple ring-shaped network according to an embodiment of the invention, to which a few stations are connected.

The network shown in FIG. 1 comprises a number of simple optical transmission sections 1 connected to a number of optical switching devices 2 via connections 15 and 16. Double transmission sections 3 forming the connection between the switching devices 2 and external stations 4 (one of which is shown in the figure) are also connected to the switching devices 2. Said stations 4 have an optical information signal output terminal 5 and an optical information signal input terminal 6, as well as an optical control signal output terminal 7; the output terminals 5 and 7 are connected in the station to an optical transmitter, the input terminal 6 is connected to an optical receiver. The transmission section 3 comprises a glass fibre 8 for the transmission of information signals from the station 4 to the network, in this case the switching device 2, and a glass fibre 9 for the transmission of information signals from the network—in this case the switching device 2—to the station 4. The latter glass fibre 9 moreover serves for the transmission of control signals from the station to the switching device 2. For this purpose the optical output terminal 7 is also connected to said glass fibre 9, namely by means of an optical coupler (e.g. a fused coupler; vide ref. [2]). So the glass fibre 9 serves for the transmission of information signals from the switching device 2 to the station 4 as well as for the transmission of control signals from the station 4 to the switching device 2, in which case, however, the direction of transmission of the control signals (indicated by arrows "c") is opposite to the direction of transmission of the information signals (everywhere in the figure indicated by arrows "d").

FIGURE 2

Figure 2:
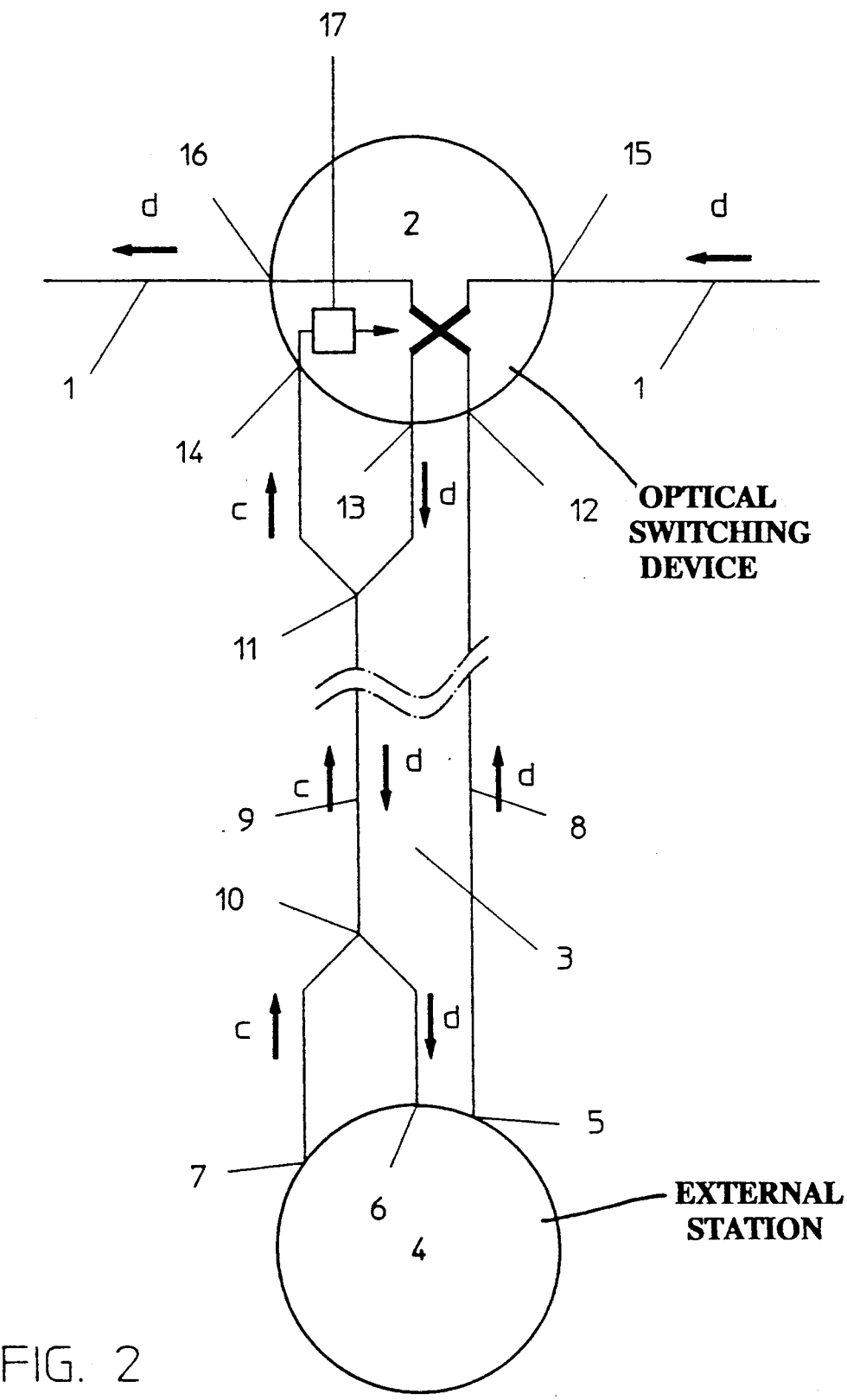
FIG. 2 shows a more detailed part of the network shown in FIG. 1 with a station connected to it.

FIG. 2 shows a further detailed view of the network part with the station connected to it as already represented in its entirety in FIG. 1. The switching device 2, i.e. an optical switch (e.g. a fused coupler switch; vide ref. [3]) belonging to that switching device 2, is controlled by means of a control device 17 also belonging to that switching device 2. Under the control of the control signal c supplied to this control device 17 the switching device can have two different switching states:—in the first switching state the switching device 2 effects two optical connections at the same time, to wit one between the terminals 12 and 13 and one between the terminals 15 and 16;—in the second switching state the switching device 2 effects two other optical connections at the same time, to wit one between the terminals 12 and 16 and one between the terminals 13 and 15. The control of the switching device 2 takes place by the control signal c, which is supplied to that switching device 2 via the terminal 14.

The switching device 2 has the former switching state prior to an actual connection between the station 4 and the network; so the former switching state is the DEFAULT-state. In this state, in which consequently on the one hand the network ring is closed via the terminals 15 and 16 and on the other hand the glass fibres 8 and 9 connected to the station 4 are through-connected with each other via the terminals 12 and 13, the station 4 can test its own working and that of the connecting section 3 before being allowed to enter the network. After said test has passed off positively the station 4 can deliver a "JOIN RING" control signal, as a result of which the switching device 2 will come into its latter switching state and consequently will insert the glass fibres 8 and 9 and the station 4 into the network by means of discontinuing the connections between the terminals 12 and 13 respectively 15 and 16, and by through-connecting the terminals 12 and 16 respectively 13 and 15. The (physical) discontinuance of the connection between the station and the network can take place in the same way—by supplying a control signal to the switching device—as in which the connection to the network was effected.

The control signals c from the station 4 to the switching device 2 are transmitted via the same glass fibre 9 as the information signals d, which are transmitted from the network—via the switching device 2—to the station 4. So the control signals and the information signals have in this embodiment opposite directions of transmission, which has the advantage that for joining as well as for separating the control signal and the information signal simple couplers (e.g. fused couplers) can be used. The control signal is preferably transmitted at a wavelength of 850 nm and the information signal at a wavelength of 1300 nm.

FIGURE 3

Figure 3:
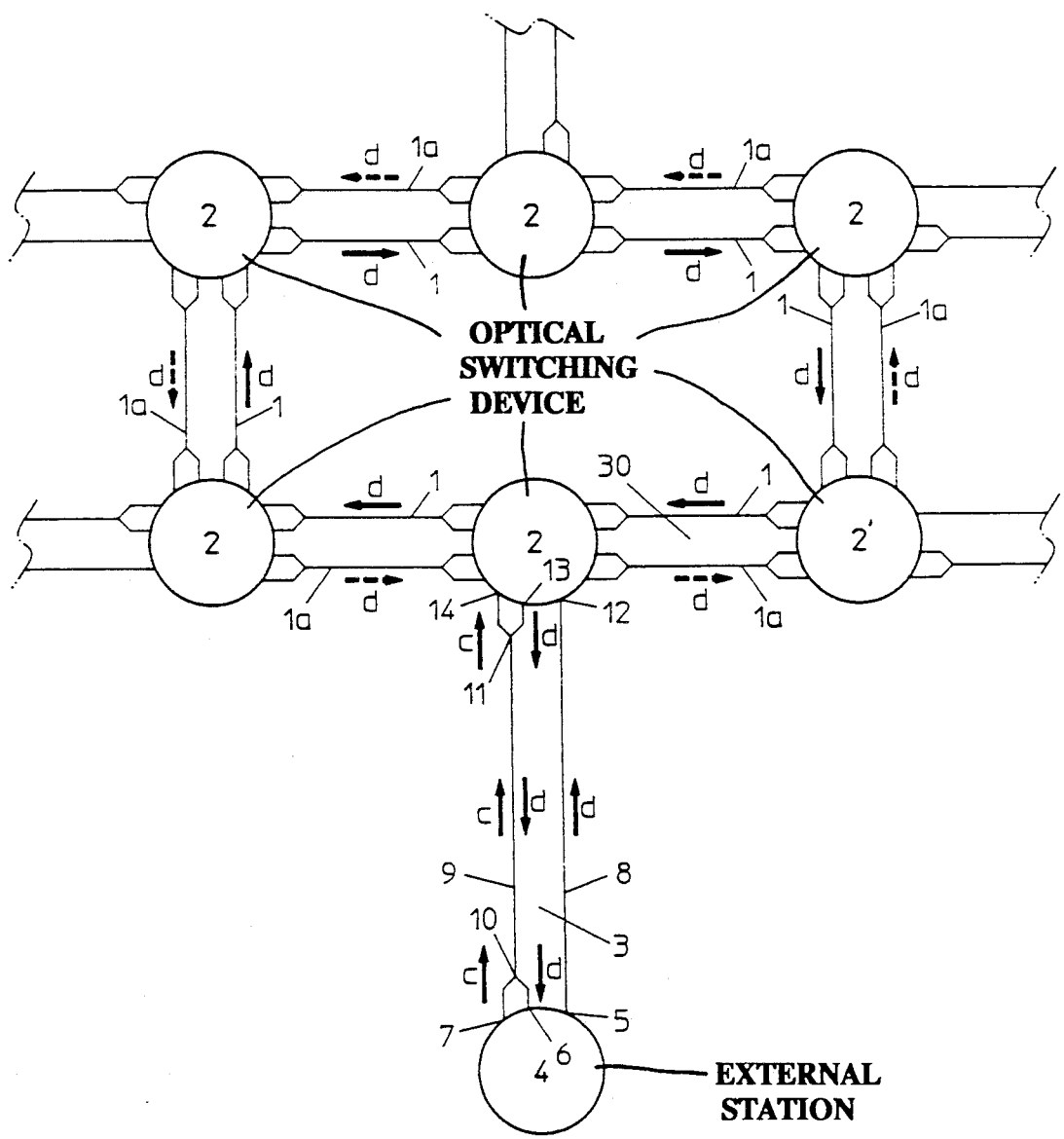
FIG. 3 shows a dual reversible ring-shaped network according to an embodiment of the invention, to which a few stations are connected.

In the same way as in which the switching device 2 can be controlled from a connected station 4, a switching device can also be controlled by some other switching device of the network. This will be particularly desirable if the network, at least the ring-shaped part of it, is designed in duplicate, in order to ensure that in the event of a disturbance or during work on part of the network ring, the information signals can be diverted, due to which the network—or at least a large part of it—can remain operating. Such network configurations are known per se inter alia from the publication mentioned under B. FIG. 3 shows such a network configuration, which corresponds to the "Dual Reversible Fiber Ring" known from said publication. Normally information signals—indicated by the non dashed-line arrows "d"—are transmitted via a primary ring, formed by the glass fibres 1; in the event of a disturbance and the like the information signals—indicated by the dashed-line arrows "d"—can be diverted via (part of) a secondary ring, formed by glass fibres 1a.

FIGURE 4

Figure 4:
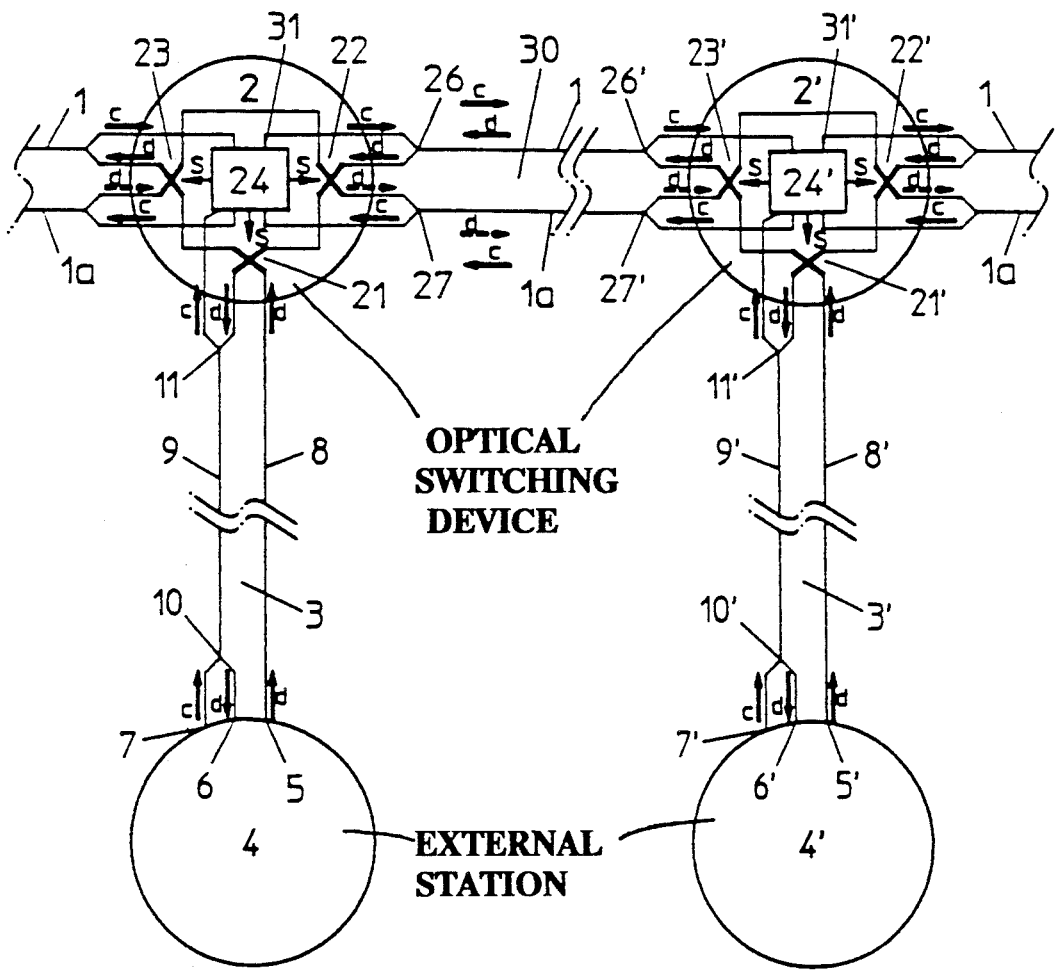
FIG. 4 shows a more detailed part of the network shown in FIG. 3 with a pair of stations connected to it.

FIG. 4 shows a further detailed representation of (part of) FIG. 3, to wit a pair of stations 4 respectively 4', connected to the switching devices 2 respectively 2' via the transmission sections 3 respectively 3'. The switching devices 2 and 2' are connected to each other by means of a double transmission section 30, formed by the glass fibres 1 and 1a, and each of them comprises three optical switches 21, 22, 23 respectively 21', 22', 23' (e.g. fused coupler switches; vide ref. [3]), which are controllable from a control device 24 respectively 24'. If, as in the case described hereinabove, the station 4 wants to be switched into the network, it will give the control signal "JOIN RING" via the glass fibre 9. This control signal is supplied to an optical receiver in the control device 24, under the influence of which this control device 24 delivers a switch signal s to the switch 21, which switches over to a state in which the glass fibre 8, the station 2 and the glass fibre 9 will be inserted into the network, id est between two successive glass fibres 1. In the same way the station 2' is inserted into the network, and the stations 2 and 2' can exchange information signals via the glass fibres 1 (see also FIG. 3). In this case information signals from station 2 to station 2' successively pass through the glass fibre 8, the switch 21, the switch 23, the consecutive glass fibres 1 (clockwise), the switch 22', the switch 21' and the glass fibre 9'. Information signals from station 2' to station 2 successively pass through the glass fibre 8', the switch 21', the switch 23', the glass fibre 1, the switch 22, the switch 21 and the glass fibre 9. The glass fibre 1a between the switching devices 2 and 2' is used for the transmission of information signals only in the event of a disturbance and the like, in which case the direction of the transmitted information signals is opposite to the direction of the information signals through the glass fibres 1, which is described in detail in ref. [1]. This datum is made use of in the present embodiment for transmitting control signals between the switching devices 2 and 2'. These signals are here, just like in the connection between the switching devices 2 respectively 2' and their connected stations 4, transmitted in a direction which is opposite to the direction in which the information signals are transmitted. Thus control signals from the switching device 2 to the switching device 2' can be transmitted via the glass fibre 1 (which primary serves for the transmission of information signals from the switching device 2' to the switching device 2); control signals from the switching device 2' to the switching device 2 can be transmitted via the glass fibre 1a (which primary serves as a spare glass fibre for the transmission of information signals from the switching device 2 to the switching device 2'). The control signals from the switching device 2 to the switching device 2' are coupled in into the glass fibre 1 by means of a coupling device 26 and the information signals from the switching device 2' to the switching device 2 by means of a coupler 26'. Likewise the control signals from the switching device 2' to the switching device 2 are coupled in into the glass fibre 1a by means of a coupling device 27' and—in case the spare glass fibre 1a is in use—the information signals from the switching device 2 to the switching device 2' by means of a coupler 27. The control signals from the switching device 2 to the switching device 2' are coupled out of the glass fibre 1 by means of the coupling device 26' and the information signals from the switching device 2' to the switching device 2 by means of the coupler 26. Likewise the control signals from the switching device 2' to the switching device 2 are coupled out of the glass fibre 1a by means of a coupling device 27 and—in case the spare glass fibre 1a is in use—the information signals from the switching device 2 to the switching device 2' by means of a coupler 27'.

In the network according to the present embodiment the control signal has in fact two functions, to wit that of a pilot signal and that of an actual control signal: by continuously watching over the existence of the control signal in a certain glass fibre it can be detected whether that glass fibre functions or does not function, and by means of the (command) contents of the control signal to a certain (addressed) control device within the network a reconfiguration of the network can be effected. Hereinafter some possible disturbances will be dealt with and also the way in which the network according to the present embodiment of the invention works. It will then also appear that for watching the whole network it will not be necessary to watch all the glass fibres by means of a control/pilot signal.

1) Break in the transmission section 3 (both glass fibres 8 and 9):

In the switching device 2 it is detected by the control device 24 that the control/pilot signal is missing, after which the switch 21 is switched over by the control device 24, as a result of which the station 4 will be switched off from the network and the glass fibres 1 on both sides of the switching device 2 will be through-connected to each other via the switches 22 and 23.

2) Break in the transmission section 3 (only glass fibre 9):

This glass fibre 9 is directly watched by the control/pilot signal, so that in the event of a break in it the control device 24 will detect the absence of the control/pilot signal and will switch over the switch 21.

3) Break in the transmission section 3 (only glass fibre 8):

This glass fibre 8 is not watched by a control/pilot signal. In this case, however, the next receiving station 4' will detect the absence of each information signal and pass this on to the switching device 24'. Since the switching device 24' does receive a control/pilot signal from the station 4', the control device 24' will instruct the control device 24 of the preceding switching device 2 to switch the station 4 out of the network by switching over the switch 21.

4) Break in the transmission section between two successive switching devices 2 and 2' (both glass fibres 1 and 1a):

On the side of the switching device 2' the control device 24' detects the absence of the control/pilot signal—coming from the control device 24—, which absence is due to the break in the glass fibre 1, and switches over the switch 23', as a result of which the information signals coming from the station 4' are diverted via the switched-over switch 23' and the switch 22' to the glass fibre 1a (on the side of the switching device 2' not facing the faulty transmission section). So the spare network ring, formed by the glass fibres 1a (with the exception of the faulty glass fibre 1a between the switching devices 2 and 2') is now used for diverting the information signals. On the side of the switching device 2 the control device 24 detects the absence of the control/pilot signal—coming from the control device 24'—and also an announcement from the station 4 that it does not receive any information signal, whereupon the control device 24 switches over the switch 22, as a result of which information signals coming from the spare network ring (in this case the glass fibre 1a on the side of the switching device 2 not facing the faulty transmission section) are supplied to the station 4 via the switched-over switch 23 and the switch 21 and via the glass fibre 9 (see also FIG. 3).

5) Break in the transmission section between two successive switching devices 2 and 2' (only glass fibre 1):

Just like in the preceding case the control device 24' detects on the side of the switching device 2' the absence of the control/pilot signal—coming from the control device 24—, which absence is due to the break in glass fibre 1, and switches over the switch 23', as a result of which the information signals coming from the station 4' are diverted via the switched-over switch 23' and the switch 22' to the glass fibre 1a (on the side of the switching device 2' not facing the faulty transmission section). So the spare network ring, formed by the glass fibres 1a (with the exception of the faulty glass fibre 1a between the switching devices 2 and 2') is now used for diverting the information signals. On the side of the switching device 2 it is not found that the control/pilot signal has been left out, since the glass fibre 1a between the switching devices 2 and 2' has remained intact in. this case. In order to connect the station 4—via the switch 21—to the spare network ring, the switch 22 is now, however, switched over because of the fact that the control device 24' instructs the control device 24—via the intact glass fibre 1a between the switching devices 2 and 2'—to switch over the switch 22.

A mending of a break in the glass fibre can be detected by the network or by the relevant station, after which the relevant glass fibres can be put into use again:

1) Mending a break in a glass fibre between a station and the relevant switching device:

After the station 4 is switched off from the network due to a break in the glass fibre in its transmission section 3 (see hereinabove under 1), 2) and 3)) it carries out a routine test in which it investigates its own working and that of the transmission section 3. As soon as the faulty transmission section 3 has been mended, the station 3 will give a "JOIN" order to the control device 24, which then switches over the switch 21, as a result of which the station 3 is inserted into the network ring again.

2) Mending a break in a glass fibre between the switching devices 2 and 2':

After a break in one of the glass fibres 1 and 1a or in both of them has been mended, a control/pilot signal will be received again by the control devices 24 and 24', whereupon these control devices 24 and 24' will switch the respective switches 22, 23, 22' and 23' into their original state again.

D. REFERENCES

[1] Beardsley A., et al. On survivable rings Telephony, April 15/85, pp. 53-64
[2] Payne, F. P. Fused single-mode optical fibre couplers J. Inst. Electron. & Telecom. Eng., Vol. 32 no. 4 (1986), pp. 319-326
[3] Diemeer M. B. J.; De Vries, W. J. Fused coupler switch using a thermo-optic cladding Electronic Letters, April 14/88, Vol. 24 no. 8, pp. 457-8.

We claim:

1. A network for transmitting information signals between stations connected to that network, said network containing a plurality of switching devices and further comprising:

a plurality of first transmission means (1), each having an optical conductor and each connecting together two of said switching devices (2) by said optical conductor, for transmitting said information signals, each of said switching devices being thereby connected either by at least one said first transmission means to each of two other said switching devices or else by at least two said first transmission means in each case to at least one other said switching device;

a plurality of second transmission means (8,9), each having an optical conductor and each connecting a single said station (4) with a said switching device (2) by its said optical conductor for transmitting said information signals and each belonging to a pair (8, 9) of said second transmission means connecting the same one of said switching devices (2) with the same one of said stations (4);

all of said first and second transmission means having means for transmitting signals entirely by transmission that takes place in the optical domain;

means in each of said stations (4) for generating control signals for controlling said switching devices and for transmitting said control signals over a said second transmission means (9) to a said switching device (2) to which the station is thereby connected;

means in each of said switching devices (2), responsive to said control signals, from a said station for in the alternative (a) connecting a pair of said first transmission means (1) respectively to a said pair (8,9) of said second transmission means of (b) connecting said pair of first transmission lines to each other while at the same time connecting to each other at said switching device said pair (8,9) of second transmission means, each of said switching devices also constituting means for selectively switching optically transmitted signals between a first selected optical conductor and a second selected optical conductor wherein the switching takes place in the optical domain;

said second transmitting means of each said pair (8,9) connected to the same one of said stations (4) including in each case at least one second transmitting means of a first kind (9) having means at one end thereof for separating said control signals from said information signals, means for differently transmitting, respectively, said control and information signals in said optical conductor of said second transmission means of the first kind and means at another end of said second transmission means of the first kind for injecting said control signals into said optical conductor thereof, others of said second transmission means being of a second kind having no said signal separating means and no said control signal injecting means, all said signal separating means and control signal injecting means being means in which the respective separating and combining of control and information signals take place in the optical domain.

2. The network of claim 1, wherein the connection of each said switching device to another said switching device is provided by two of said first transmission means respectively coupled to said switching devices optically for transmission of information in opposite directions between the two switching devices connected by them, said first transmission means having means at one end thereof for injecting control signals and means at the other end thereof for separating said control signals from information signals and wherein said switching devices have means responsive to control signals produced by a said station for producing substitution of a connection of one of said two first transmission means for the other of said two first transmission means and for switching control signals received from a said station connected to a first switching device for transmission to a second switching device of two said switching devices connected to each other.

3. The network of claim 1, in which, in the signal injecting and signal separating means of each of said second transmission means of said first kind, said information signals and said control signals are, respectively, directly coupled into the same optical conductor and directly coupled out of the same, in each case by means of optical coupling devices.

4. The network of claim 3, wherein said coupling devices are constituted as fused couplers.

5. The network of claim 3, wherein the connection of each said switching device to another said switching device is provided by two of said first transmission means respectively coupled to said switching devices optically for transmission of information in opposite directions between the two switching devices connected by them, said first transmission means having means at one end thereof for injecting control signals and means at the other end thereof for separating said control signals from information signals and wherein said switching devices have means responsive to control signals produced by a said station for producing substitution of a connection of one of said two first transmission means for the other of said two first transmission means and for switching control signals received from a said station connected to a first switching device for transmission to a second switching device of two said switching devices connected to each other.

6. The network of claim 3, in which, in each said second transmission means of said first kind, said separating means are provided at the end of said transmission means which is connected to a said switching device, said control signal injecting means are provided at the end of said transmission means which is connected to a said station and information signals are coupled in to a said switching device at the end of said transmission means at which said separating means are provided and coupled out from a said station at the end of said transmission means at which said control signal injecting means are provided.

7. The network of claim 6, wherein the connection of each said switching device to another said switching device is provided by two of said first transmission means respectively coupled to said switching devices optically for transmission of information in opposite directions between the two switching devices connected by them, said first transmission means having means at one end thereof for injecting control signals and means at the other end thereof for separating said control signals from information signals and wherein said switching devices have means responsive to control signals produced by a said station for producing substitution of a connection of one of said two first transmission means for the other of said two first transmission means and for switching control signals received from a said station connected to a first switching device for transmission to a second switching device of two said switching devices connected to each other.

8. The network of claim 7, in which in said first transmission means said control signal injecting means are provided at the end of said first transmission means at which information signals are coupled out from a first said switching device for transmission to a second said switching device and said control signal separating means are provided at the end of said transmission means where information signals are coupled in to said first switching device after transmission from said second switching device.

9. The network of claim 3, wherein said coupling devices provide for optical transmission in said optical conductor of said information signals in a first optical transmission mode and for transmission of said control signals in a second optical transmission mode distinguishably different from said first optical transmission mode.

10. The network of claim 9, in which, in each said second transmission means of said first kind, said separating means are provided at the end of said transmission means which is connected to a said switching device, said control signal injecting means are provided at the end of said transmission means which is connected to a said station and information signals are coupled in to a said switching device at the end of said transmission means at which said separating means are provided and coupled out from a said station at the end of said transmission means at which said control signal injecting means are provided.

11. The network of claim 9, wherein said coupling devices are constituted as fused couplers.

12. The network of claim 9, wherein the connection of each said switching device to another said switching device is provided by two of said first transmission means respectively coupled to said switching devices optically for transmission of information in opposite directions between the two switching devices connected by them, said first transmission means having means at one end thereof for injecting control signals and means at the other end thereof for separating said control signals from information signals and wherein said switching devices have means responsive to control signals produced by a said station for producing substitution of a connection of one of said two first transmission means for the other of said two first transmission means and for switching control signals received from a said station connected to a first switching device for transmission to a second switching device of two said switching devices connected to each other.

13. The network of claim 9, wherein said control signals are transmitted optically at a wavelength which is different from the wavelength at which said information signals are transmitted.

14. The network of claim 13, in which, in each said second transmission means of said first kind, said separating means are provided at the end of said transmission means which is connected to a said switching device, said control signal injecting means are provided at the end of said transmission means which is connected to a said station and information signals are coupled in to a said switching device at the end of said transmission means at which said separating means are provided and coupled out from a said station at the end of said transmission means section at which said control signal injecting means are provided.

15. The network of claim 13, wherein said coupling devices are constituted as fused couplers.

16. The network of claim 13, wherein the connection of each said switching device to another said switching device is provided by two of said first transmission means respectively coupled to said switching devices optically for transmission of information in opposite directions between the two switching devices connected by them, said first transmission means having means at one end thereof for injecting control signals and means at the other end thereof for separating said control signals from information signals and wherein said switching devices have means responsive to control signals produced by a said station for producing substitution of a connection of one of said two first transmission means for the other of said two first transmission means and for switching control signals received from a said station connected to a first switching device for transmission to a second switching device of two said switching devices connected to each other.

* * * * *